United States Patent [19]

Ono et al.

[11] Patent Number: 5,727,885
[45] Date of Patent: Mar. 17, 1998

[54] SLIDING BEARING HALF SHELL

[75] Inventors: Akira Ono; Hiroshi Naitoh; Mitsuyoshi Ohara; Koji Baba; Yukou Sugawara; Yoshikazu Mizuno; Seigo Hanji, all of Nagoya, Japan

[73] Assignee: Daido Metal Company Ltd., Nagoya, Japan

[21] Appl. No.: 787,225

[22] Filed: Jan. 22, 1997

[30] Foreign Application Priority Data

Jan. 31, 1996 [JP] Japan .................................. 8-038733

[51] Int. Cl.⁶ .............................. F16C 33/04; F16C 9/02
[52] U.S. Cl. ................................. 384/294; 384/430
[58] Field of Search ........................... 384/216, 288, 384/294, 296, 429, 430, 432, 433, 434, 906

[56] References Cited

U.S. PATENT DOCUMENTS

| | | | |
|---|---|---|---|
| 2,124,060 | 7/1938 | Gilman | 384/294 X |
| 3,576,353 | 4/1971 | Barker et al. | 384/430 |
| 4,231,623 | 11/1980 | Kaufman | 384/429 |
| 4,775,249 | 10/1988 | Roemer et al. | 384/296 |
| 4,845,817 | 7/1989 | Wilgus | 384/288 X |

FOREIGN PATENT DOCUMENTS 57-202018  12/1982  Japan .
63-106914   7/1988  Japan .

Primary Examiner—Thomas R. Hannon
Attorney, Agent, or Firm—Browdy and Neimark

[57] ABSTRACT

A positioning lug 13 is formed which curvedly expands outwardly along the circumference of a half-circular bearing body 11 from the external surface of the bearing body. The positioning lug 13 is provided so that both transition sections thereof are integrated at a circumferential ends 12 with the bearing body 11. Unlike a conventional sliding bearing half shell provided with a tongue-like positioning lug protruding from a proximal end line 14, with transition sections separated from the bearing body, the sliding bearing half shell according to the present invention does not undergo the failure of its positioning lug due to the fatigue of the proximal end line 14 caused by cyclic bending stress.

5 Claims, 5 Drawing Sheets

SLIDING BEARING HALF SHELL

BACKGROUND OF THE INVENTION

The present invention relates to a sliding bearing half shell, more particularly to the sliding bearing half shell which is provided with a positioning lug.

A pair of half circular sliding bearing shells are combined with each other to form a cylindrical shape and assembled into a bearing housing, which are widely used for automotive engines. For example, in FIG. 7 showing a shaft 81 rotatably assembled to a connecting rod 80 for an engine of motor car, a pair of sliding bearing half shells 1A, 1B are incorporated in a space defined by the connecting rod 80 and a cap 83 which is assembled to the connecting rod 80 with bolts 82. A slot 84 is formed in the inner surface adjacent to a contact surface 80a of the connecting rod 80, to which the cap 83 is assembled. A positioning lug 3, which is projected outwardly from the body 2 of the bearing half shell 1A, is engaged in the slot 84. When the shaft 81 rotates in the direction as indicated by arrow X, the stopper end 4 of the positioning lug 3 is brought into contact with the joint surface of the cap 83 to prevent the bearing to rotate together with the rotary shaft.

As shown in FIG. 8, the positioning lug 3 of the sliding bearing half shell 1A is formed by press-working the bearing body 2, which is formed from a plate, outwardly from inside the bearing body with utilization of a punch. The positioning lug 3 of the sliding bearing half shell 1A is engaged in the slot 84 of the housing to position the bearing at both sides 5 of the lug 3. The positioning lug 3 is formed like a tongue protruding outwardly from a proximal end line 6 at which the lug 3 is integrally connected to the bearing body 2 while the both sides 5 are separated from the bearing body 2. Even if the both sides 5 are not fully separated from the bearing body, the positioning lug may contain some cracks due to its forming way such that the transition portion thereof is weak and brittle.

JP-U-57-202018 and JP-U-63-106914 teach other such positioning lugs.

JP'018 discloses a positioning lug 93 which is formed at a part following an oil groove in a housing to prevent cavitation from occurring on the end of a sliding bearing half shell (FIG. 9), and which is expanded outwardly from a bearing body 92 by pressing.

JP'914 discloses a positioning lug 96 (FIG. 10) which is integrally expanded outwardly from a bearing body 95 so as to provide a notch oblique in the direction of the axis of the bearing to increase frictional resistance of the positioning lug 96.

In recent years, motor car engines have been developed each of which has a housing reduced in wall thickness for weight reduction and is operated at a high speed more than 7000 rpm. During studying a sleeve type half bearing that can be used in such high speed engines, the inventors found that the positioning lug of a tongue shape breaks at its proximal region. It appears that an entire housing of a connecting rod, within which a shaft is assembled with the bearing cyclically undergoes high degree strain due to the reduced weight connecting rod and a high rotational engine speed, thus exerting a heavy load on the stopper surface of a positioning lug and applying repeated bending stress to the base of the lug in the radial direction indicated by arrow Y in FIGS. 8 and 10, so that the lug breaks due to fatigue. The inventors made studies to solve the problem of break of positioning lugs resulting in the present invention.

JP'018 is silent on strength of the positioning lug 93, formed at the oil groove in the housing. The positioning lug disclosed has an indent 94 inside the bearing, the indent being identical in width to a projection outside the bearing. In addition, the positioning lug 93 suffers from cracks C at both sides thereof or the deformed region of the lug is weak and brittle because the lug is formed by pressing the bearing body.

JP'914 deals with wear occurred on the stopper surface of the positioning lug 96 without mentioning on strength thereof. Since the positioning lug is arranged by projecting a notch so that it is oblique in the direction of the axis of a bearing, a crack D occurs, or the deformed region of the positioning lug becomes weak when the notch is formed by pressing. What is worse, the positioning lug is liable to break at the proximal region 97 thereof when subjected to cyclic stress in the direction indicated by arrow Y.

SUMMARY OF THE INVENTION

According to a first feature of the invention, there is provided a sliding bearing half shell having a cross sectional half-circular shape, which is provided with a positioning lug which is curvedly expanded outwardly along the circumference of the bearing body from the external surface thereof to one of the circumferential ends of the bearing body and which has no separated portions from the bearing body.

The sliding bearing half shell according to the first feature of the invention is assembled into a housing together with another one, and the positioning lug is engaged in a positioning slot being formed on the inner surface of the housing so that the assembled sliding bearing half shells support a rotary shaft. During operation of the shaft rotation, the positioning lug receives a pressing force through its end surface and a pressure on its external surface due to an elastic deformation of the housing member. However, since the positioning lug is integrally formed with the bearing body and has no separated portions from the bearing body, the both side portions of the positioning lug well withstands the pressing force and the pressure, it is prevented from damage. This is contrast to the conventional positioning lug having a tongue like shape which bears such pressing force only by the proximal end region thereof.

According to a second feature of the invention which is a more specified one of the above first feature, the positioning lug is provided in the middle of the circumferential end, whose recessed inner surface comprises a bottom surface and both side surfaces, the bottom surface being parallel to the axis of the sliding bearing half shell and the both side surfaces being divergently oblique to the bottom surface.

According to a third feature of the invention, the positioning lug is provided in the middle of the axial length of the circumferential end, whose recessed inner surface comprises a bottom surface, both side surfaces surfaces, and rounded corners between the bottom surface and the both side surfaces.

According to a fourth feature of the invention which is a more specified one of the above first feature, the positioning lug is provided at one of the axial ends of the circumferential end of the sliding bearing half shell, whose recessed inner surface comprises a bottom surface and a side surface, the bottom surface being parallel to the axis of the sliding bearing half shell and the side surface being oblique to the bottom surface.

According to a fifth feature of the invention, the positioning lug is provided at one of the axial ends of the circumferential end of the sliding bearing half shell, whose recessed inner surface comprises a bottom surface, a side surface, and a rounded corner between the bottom surface and the side surface.

Such bearing half shells can be produced easily by means of the press forming.

The bearing half shell of the invention having the positioning lug well withstands a pressing force through its end surface and a pressure on its external surface due to an elastic deformation of the housing, which contains the bearing half shell, during operation, since the positioning lug is curvedly expanded outwardly along the circumference of the bearing body from the external surface thereof to one of the circumferential ends of the bearing body and has no separated portions from the bearing body.

PREFERRED EMBODIMENTS OF THE INVENTION

Figure 1:
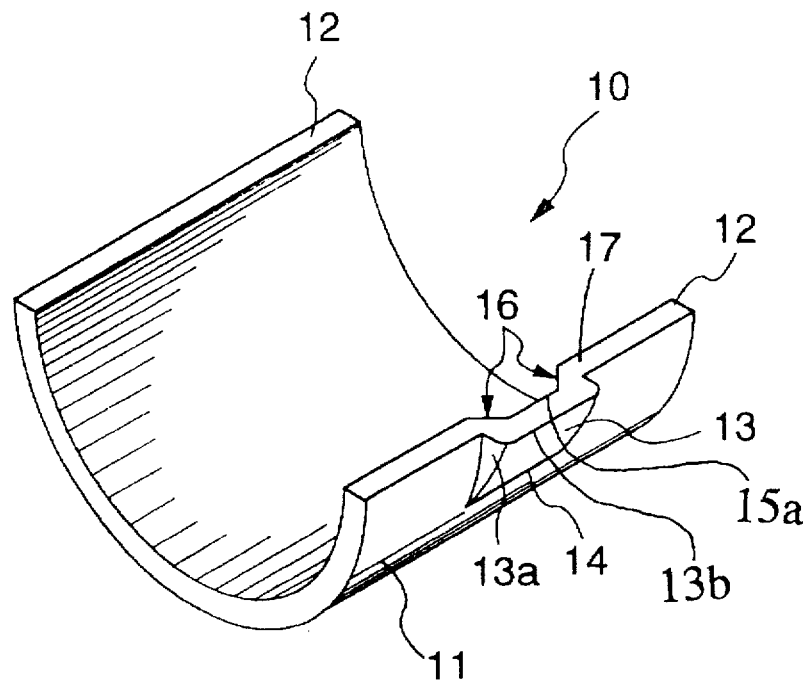
FIG. 1 is a general perspective view of a sliding bearing half shell according to embodiment 1.
Figure 2:
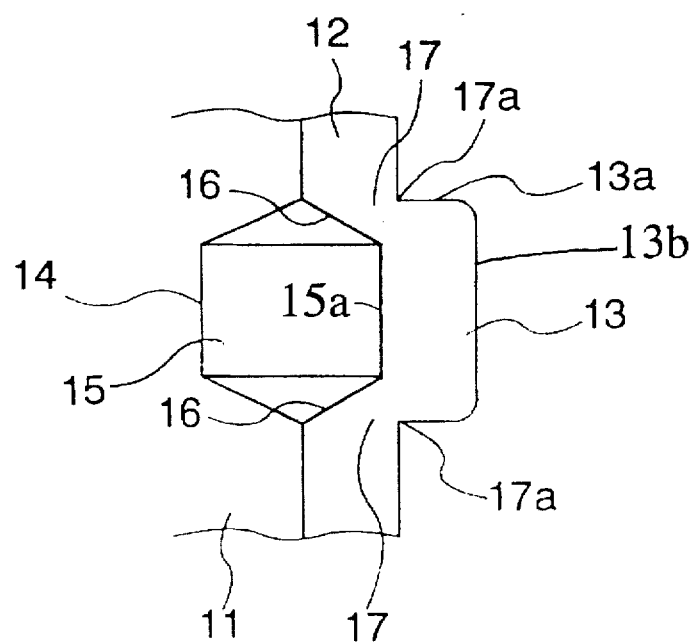
FIG. 2 is a partially enlarged top view of a positioning lug of the sliding bearing half shell in FIG. 1.
Figure 3:
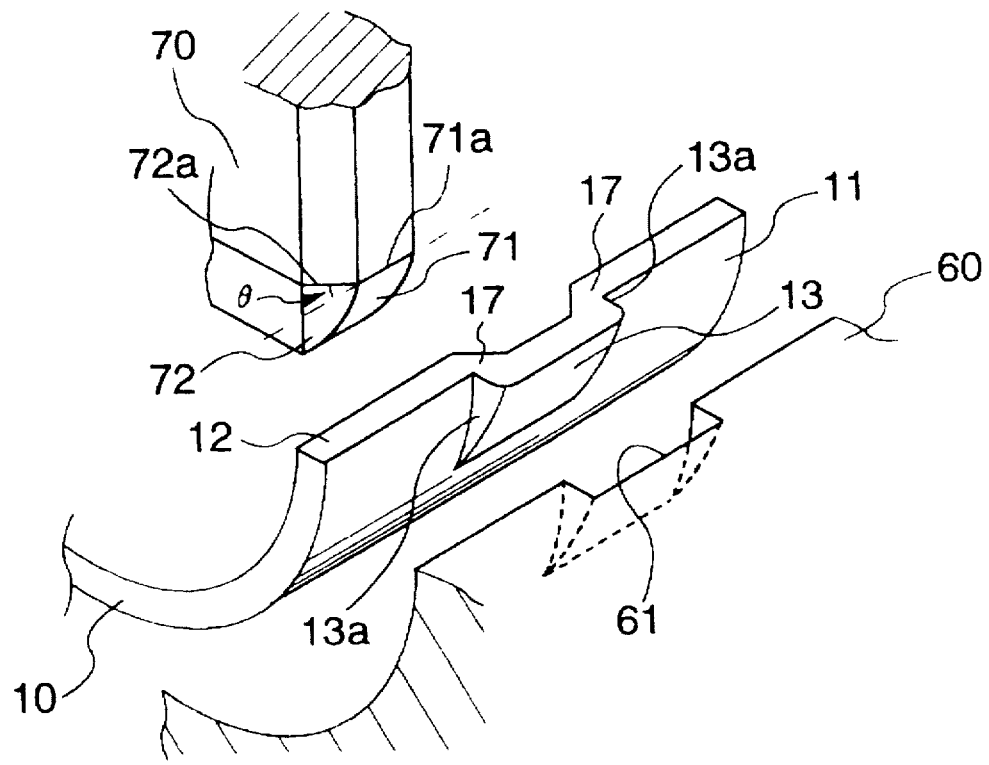
FIG. 3 illustrates a die and a punch used to form a positioning lug.

Referring now to FIGS. 1 through 6, embodiments 1 through 4 of the present invention are described below.
Embodiment 1:

FIGS. 1 through 3 show a sliding bearing half shell 10 according to embodiment 1 of the present invention, in which a backing steel sheet 20 mm wide and 1.2 mm thick, and a sliding layer 0.3 mm thick having a low coefficient of friction on the inner surface of the backing steel sheet are integrally formed by sintering with each other to form a half-circular bearing body 11. Both circumferential ends 12 of the bearing body 11 are brought into contact with another bearing half shell. A positioning lug 13 which is expanded outwardly is provided in the middle of one of the circumferential ends 12. As shown in FIG. 3, the positioning lug 13 is formed by pressing the bearing body with utilization of a punch 70, with the external surface of the bearing body supported by a die 60. The die 60 is provided with a forming slot 61 for forming the external surface of the positioning lug 13. The punch 70 is provided at its lower end (FIG. 3) with a front forming surface 71 and side forming surfaces 72 which are continuous from the front forming surface 71 with a receded angle, respectively, such that a phantom line extended from an upper boundary line 71a of the front forming surface 71 and an upper boundary line 72a of the side forming surface 72 make an angle θ of 60°. Preferably the angle can be varied within a range of 20° to 80°. As shown in FIG. 1, the positioning lug 13, formed by the die 60 and punch 70, expanded outwardly from the bearing body, starting at a bend (or proximal end line) 14, on the external surface of the bearing body and terminating in the end 12. At the circumferential end 12, the positioning lug protrudes 1.0 mm from the circumference of the bearing body. In the inside indent, a parallel surface or bottom surface 15 of 1.5 mm wide is provided which is parallel to the axis of the bearing body. Transition sections 17, fanning out along tapered surfaces or side surfaces 16 on both sides of the parallel surface, are formed integrally with the circumferential end 12.

Figure 7:
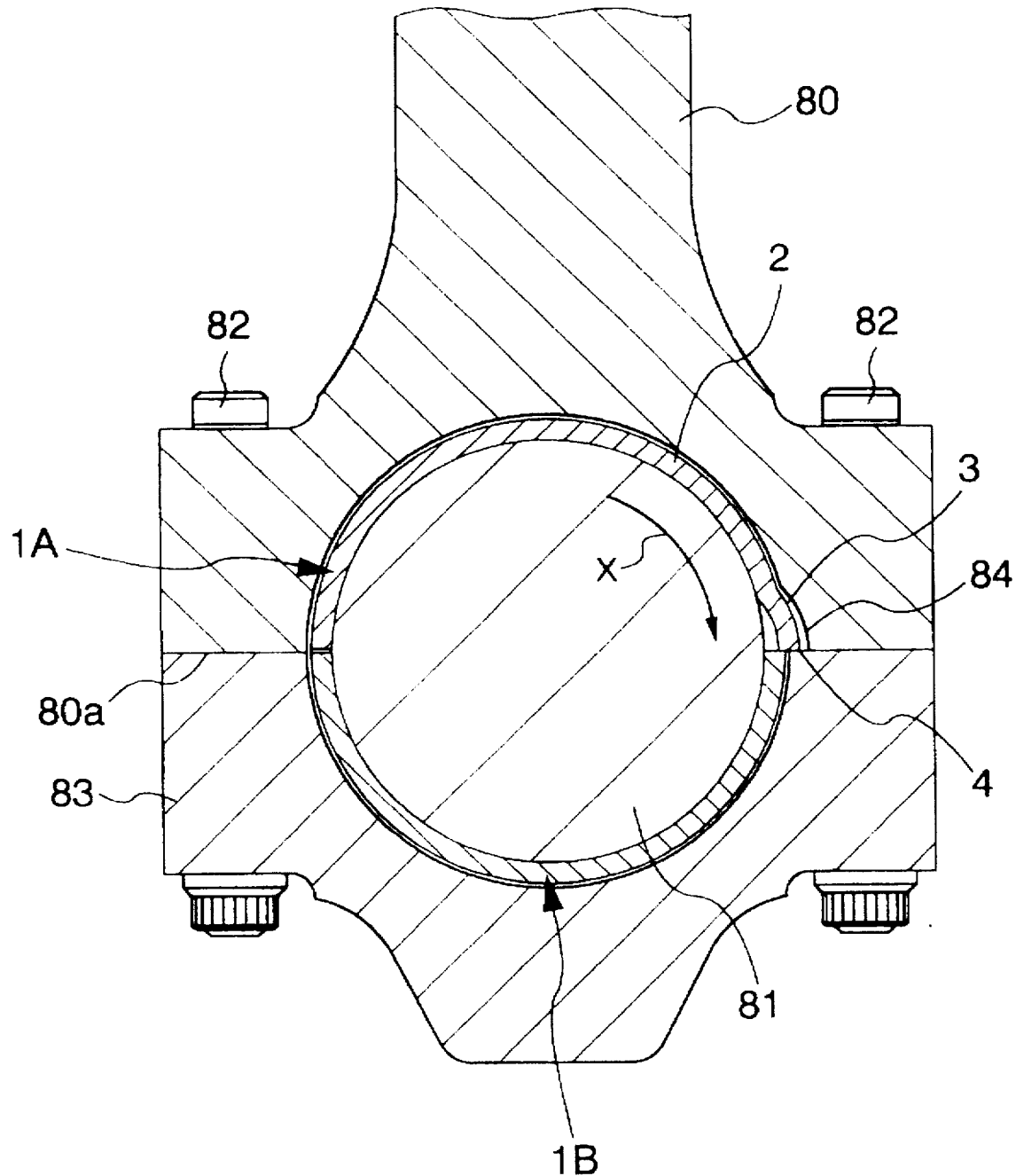
FIG. 7 is a cross-sectional view showing sliding bearing half shells assembled in a known housing of a connecting rod for an automotive engine.
Figure 8:
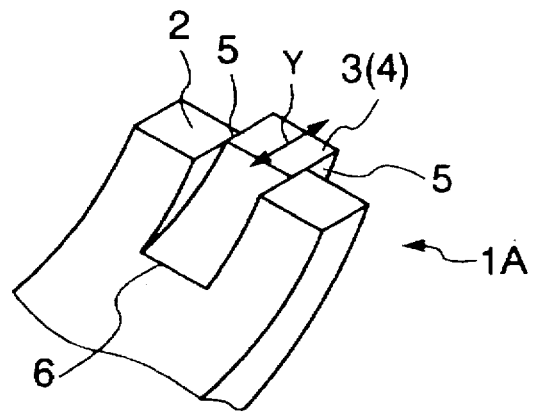
FIG. 8 is a partially enlarged view of a conventional positioning lug.
Figure 9:
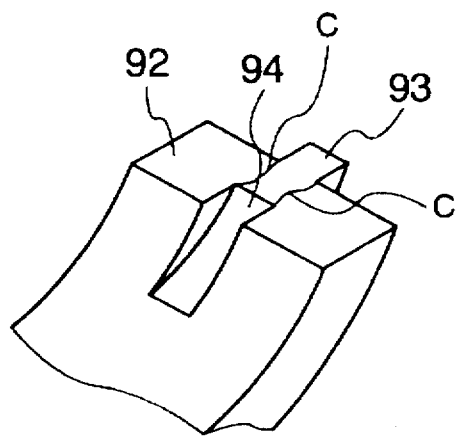
FIG. 9 is a partially enlarged view of a positioning lug according to conventional example 1.
Figure 10:
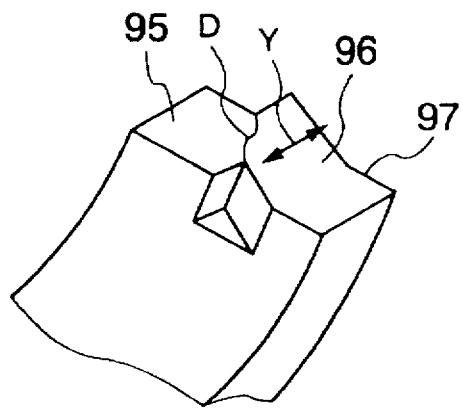
FIG. 10 is a partially enlarged view of a positioning lug according to conventional example 2.

As described in the introductory description, when the bearing half shell 10 is assembled in such bearing housing shown in FIG. 7, the positioning lug 13 is engaged in the slot 84 of the housing, thus the shoulder radius of the die must be made as small as possible to install the sliding bearing half shell in an ordinary housing having an engagement slot whose edge is not rounded. Thus outer corners 17a of the transition section 17 is formed on the outer surface of the sliding bearing half shell 10 so as to have a generally right angle. This concentrates stress on the outer corners 17a during pressing, thus tending to cause cracking. In embodiment 1, however, providing the tapered surfaces 16 inside the positioning lug prevents cracking and allows the transition sections 17 with a sound metal structure, which are integrated with the circumferential ends. To obtain maximum axial positioning performance from the positioning lug 13, assembled into the slot 84, flat surfaces 13a at right angles to the axis of the bearing body are formed at the transition sections 17. To facilitate axial positioning with the abutting surface of the cap 83 during bearing installation, the flat surfaces 13a are preferably made as broad as possible. The external surface of the positioning lug 13 and respective flat surfaces 13a are made to intersect at right angles to each other as far as possible (i.e., the angle of an outside corner of the positioning lug 13 is made as near 90° as possible).

The positioning lug 13 includes an inner edge line 15a and an outer edge line 13b. As seen in FIGS. 1 and 2, both are linear and generally parallel to an axis of the bearing body. The transition section 17 includes two oppositely facing outer flat surfaces 13a, which are also the side surfaces of the positioning lug 13. These are generally perpendicular to the bearing axis and to a phantom surface extending from the primary outer surface of the positioning lug 13, as seen in the drawing. The angle of the respective outside corners, which are defined by the outer flat surfaces 13a and the outer surface of the positioning lug 13, is made close to 90°, as seen in FIG. 2.

When a sliding bearing half shell arranged according to embodiment 1 is used in the connecting rod 80 of a high speed engine running at more than 7000 rpm, a pressing force and a stress accompanied by housing deformation act on the circumferential end 12 of the positioning lug 13. The bearing body and positioning lug 13 are integrated by the transition sections 17 with each other, so that the positioning lug 13 of embodiment 1 is not weak even on the circumferential end 12. Moreover, unlike a conventional tongue-like positioning lug, no stress is applied to the bend (or proximal end line) of the positioning lug according to the present invention. These two advantages prevent the positioning lug 13 from damage.

To show the effects of embodiment 1, a 200-hour durability test was performed on a conventional sliding bearing half shell and a sliding bearing half shell according to embodiment 1, both of which were installed in an automotive engine. In the test, the positioning lug of the conventional sliding bearing half shell did not break at 7000 rpm but broke at 8000 rpm, while that of the sliding bearing half shell according to embodiment 1 did not break even at 9000 rpm.

Figure 4:
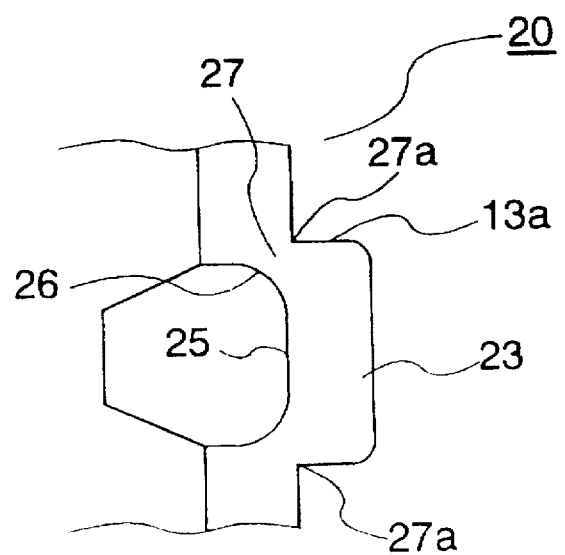
FIG. 4 is a partially enlarged top view of a positioning lug according to embodiment 2.

Embodiment 2:

FIG. 4 shows a sliding bearing half shell 20 according to embodiment 2. Below are described only differences between a positioning lug 23 of the sliding bearing half shell 20 and the positioning lug 13, since embodiment 1 differs from embodiment 2 in terms of positioning lug shape.

In the inside indent of the positioning lug 13 according to embodiment 1, the tapered surfaces 16 are formed on both sides of the parallel surface 15 which is parallel to the axis of the bearing half shell. On the other hand, in embodiment 2, curved surfaces or rounded corners 26 are provided on both sides of a parallel surface or bottom surface 25, as shown in FIG. 4. These curved surfaces ensure a satisfactory wall thickness inside corresponding to outer corners 27a of transition sections 27, thus preventing the transition sections from cracking. The transition sections 27 are integrated at the circumferential end 12 with the positioning lug. Only the punch 70 used for embodiment 1 changes to a punch that is used to form the curved surfaces 26 according to embodiment 2.

Using the sliding bearing half shell 20 according to embodiment 2, which has the same effects as that according to embodiment 1, in the connecting rod 80 of an engine running at high speeds does not cause the positioning lug 23 to break.

Figure 5:
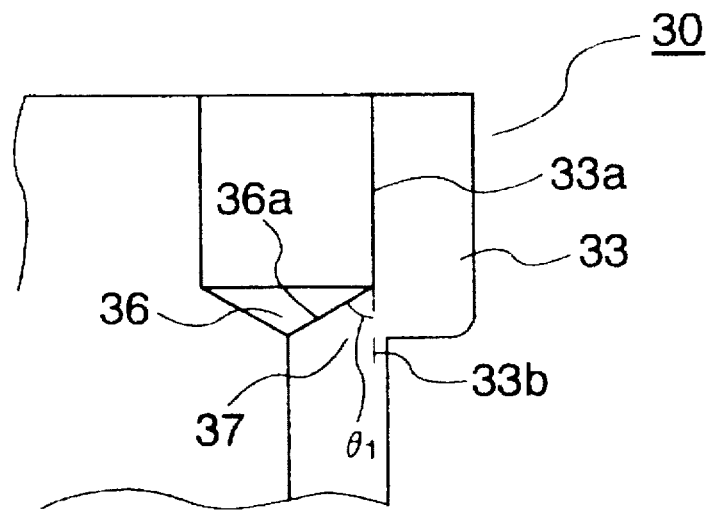
FIG. 5 is a partially enlarged top view of a positioning lug according to embodiment 3.

Embodiment 3:

FIG. 5 shows a sliding bearing half shell 30 according to embodiment 3. Unlike embodiment 1, embodiment 3 is adapted to form a positioning lug at an axial end of a sliding bearing half shell.

One end of the sliding bearing half shell 30 according to embodiment 3 is assembled into such housing shown in FIG. 7 such that a positioning lug 33 provided at an end of a circumferential end is engaged in the slot 84. A transition section 37 of the sliding bearing half shell 30, through which the positioning lug 33 is continuous from the body of the sliding bearing half shell 30 and which makes a side surface 36 of the inner surface of the positioning lug 33, is formed such that a phantom line 33b extended from an edge line 33a of the end surface of the positioning lug 33 and another edge line 36a of the side surface 36 make an angle $\theta_1$ of 60° which corresponds to the angle $\theta$ of the punch 70 (see FIG. 3).

Figure 6:
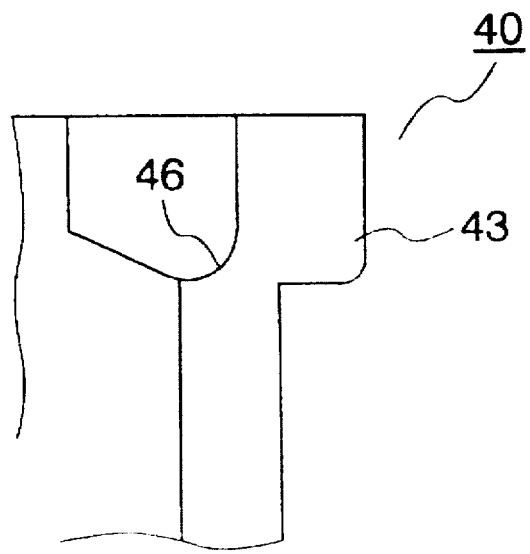
FIG. 6 is a partially enlarged top view of a positioning lug according to embodiment 4.

Embodiment 4:

FIG. 6 shows a sliding bearing half shell 40 according to embodiment 4, where a positioning lug 43 is formed at an end of a circumferential end as in the case of embodiment 3, and an inside indent is provided with a curved surface or a rounded corner 46 like as in the case of embodiment 2.

The present invention has been described above using embodiments 1 through 4. The transition sections of a positioning lug of the present invention may be integrated at a circumferential end of a bearing body with the bearing body. Therefore the invention sliding bearing half shell is not limited to embodiments 1 through 4, thus allowing the following modifications to the present invention as appropriate:

(1) In embodiment 1, the parallel surface 15 is provided which is parallel to the axis of a sliding bearing half shell. However, the parallel surface may be replaced with a gently curved surface.

(2) In embodiment 1, the sliding layer is provided on the internal surface of the positioning lug 13. However, the part of the layer on which the positioning lug 13 is to be formed may be removed.

(3) In embodiment 1, only one positioning lug 13 is formed. However, a plurality of positioning lugs may be provided as required.

What is claimed is:

1. A sliding bearing half shell (10) including a bearing body (11) having a cross-sectional half-circular shape, which is provided with a positioning lug (13); wherein:

the positioning lug is curvedly expanded outwardly along the circumference of the bearing body from an external surface thereof at one of the circumferential ends of the bearing body and includes a transition section (17; 27; 37) therebetween with no portions of the lug being separated from the bearing body;

the positioning lug including an inner edge line (15a) and an outer edge line (13b), both being generally linear and parallel to an axis of the bearing body;

the transition section (17; 27; 37) including an outer flat surface (13a) of a side surface of the positioning lug (13) and being generally perpendicular to the bearing axis and to a primary outer surface of the positioning lug (13) adjacent the outer edge line; and wherein an angle of respective outside corners, defined by the outer flat side surface (13a) and the primary outer surface of the positioning lug (13), is close to 90°.

2. A sliding bearing half shell according to claim 1, wherein the positioning lug is provided in the middle of the axial length of the circumferential end, whose recessed inner surface comprises a bottom surface and both side surfaces, the bottom surface being parallel to the axis of the sliding bearing half shell and the both side surfaces being divergently oblique to the bottom surface.

3. A sliding bearing half shell according to claim 2, wherein the recessed inner surface comprises a bottom surface, both side surfaces, and rounded corners between the bottom surface and the both side surfaces.

4. A sliding bearing half shell according to claim 1, wherein the positioning lug is provided at one of the axial ends of the circumferential end of the sliding bearing half shell, whose recessed inner surface comprises a bottom surface and a side surface, the bottom surface being parallel to the axis of the sliding bearing half shell and the side surface being oblique to the bottom surface.

5. A sliding bearing half shell according to claim 4, wherein the recessed inner surface comprises a bottom surface, a side surface, and a rounded corner between the bottom surface and the side surface.

* * * * *